United States Patent
Acerbis et al.

(10) Patent No.: US 9,376,265 B2
(45) Date of Patent: Jun. 28, 2016

(54) UNIT AND METHOD FOR FORMING A LAYER OF BATCHES OF GROUPS OF ARTICLES

(71) Applicant: GEBO PACKAGING SOLUTIONS ITALY S.r.l., Parma (IT)

(72) Inventors: Davide Acerbis, Parma (IT); Massimiliano Legati, Parma (IT)

(73) Assignee: GEBO PACKAGING SOLUTIONS ITALY S.R.L., Parma (IT)

( * ) Notice: Subject to any disclaimer, the term of this patent is extended or adjusted under 35 U.S.C. 154(b) by 108 days.

(21) Appl. No.: 14/142,484

(22) Filed: Dec. 27, 2013

(65) Prior Publication Data

US 2014/0182999 A1 Jul. 3, 2014

(30) Foreign Application Priority Data

Dec. 28, 2012 (EP) .................................... 12199778

(51) Int. Cl.
| | |
|---|---|
| *B65G 47/84* | (2006.01) |
| *B65G 43/10* | (2006.01) |
| *B65G 47/08* | (2006.01) |
| *B65G 47/31* | (2006.01) |

(52) U.S. Cl.
CPC .............. *B65G 47/086* (2013.01); *B65G 43/10* (2013.01); *B65G 47/31* (2013.01)

(58) Field of Classification Search
CPC .... B65G 47/086; B65G 43/10; B65G 47/082; B65G 47/31; B65G 47/52; B65G 47/084
See application file for complete search history.

(56) References Cited

U.S. PATENT DOCUMENTS

| | | | |
|---|---|---|---|
| 4,653,630 | A | 3/1987 | Bravin |
| 7,896,151 | B2 | 3/2011 | Meisinger |
| 8,002,105 | B2* | 8/2011 | Duchemin ............. B65G 47/29 198/419.2 |
| 9,067,741 | B2* | 6/2015 | Acerbis ................ B65G 47/084 |
| 2005/0246056 | A1 | 11/2005 | Marks |
| 2010/0038210 | A1* | 2/2010 | Cox ..................... B65G 15/105 198/460.1 |

FOREIGN PATENT DOCUMENTS

| | | |
|---|---|---|
| DE | 4002724 | 8/1991 |
| EP | 0385245 | 9/1990 |
| EP | 1223121 | 7/2002 |
| GB | 1412679 | 11/1975 |

OTHER PUBLICATIONS

European Office Action, dated May 28, 2015, in corresponding European Patent Application No. 12 199 778.7.

* cited by examiner

*Primary Examiner* — Mark A Deuble
(74) *Attorney, Agent, or Firm* — Young & Thompson

(57) ABSTRACT

There is disclosed a unit for forming a layer of a batch of groups of articles, comprising a first conveyor adapted to convey a plurality of groups in an abutting relationship; and a second conveyor adapted to separate batch from the remaining groups for a gap; unit further comprises manipulating means adapted to manipulate separated batch on an area defined by second conveyor, so as to form layer.

17 Claims, 3 Drawing Sheets

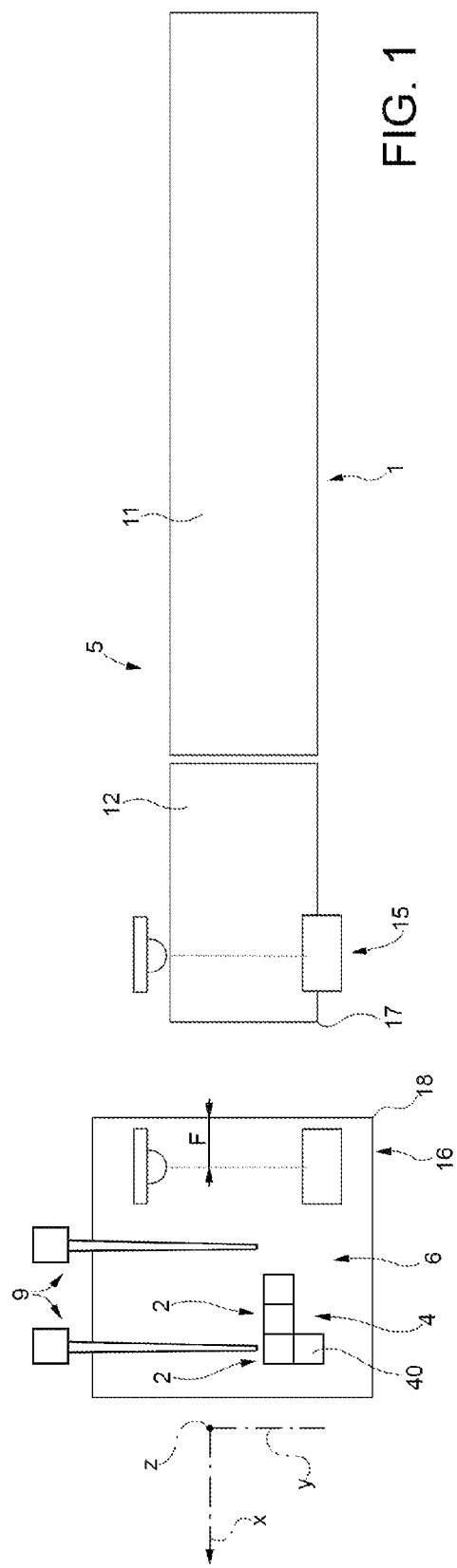
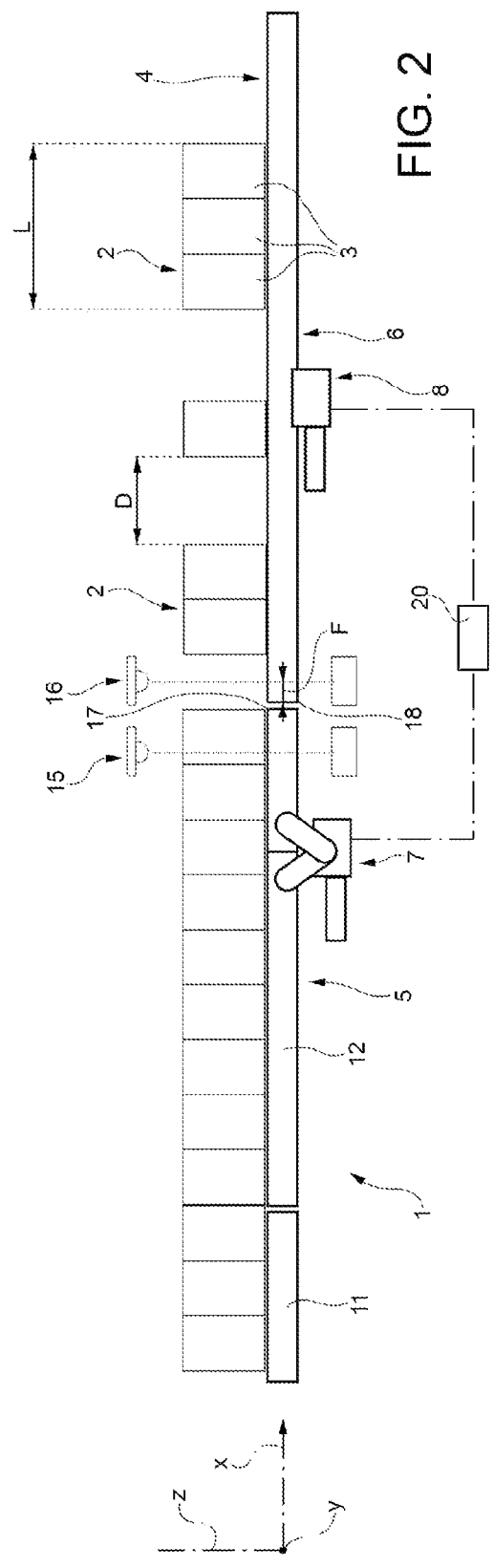

UNIT AND METHOD FOR FORMING A LAYER OF BATCHES OF GROUPS OF ARTICLES

CROSS-REFERENCE TO RELATED APPLICATION

The present application claims priority to European Patent Application No. 12199778.7, filed Dec. 28, 2012, the entirety of which is hereby incorporated by reference,

FIELD OF THE INVENTION

The present invention relates to a unit and a method for forming a layer of batches of articles, in particular containers filled with a pourable food product.

BACKGROUND OF THE INVENTION

Bottling lines are known which comprise a plurality of units for carrying out respective operations on containers.

Very briefly, the known bottling lines comprise a rinsing unit for rinsing containers, a filling unit for filling containers with a pourable food product, a capping unit for capping the containers, and a packaging unit for packaging together a given number of containers so as to form a plurality of groups of containers.

The bottling line comprises an end station fed with groups of containers travelling on one or more, typically two, rows on a horizontal conveyor along a horizontal advancing direction.

The end station comprises a unit for forming batches of groups of containers.

The above-mentioned unit is, in particular, adapted to separate a plurality of batches of groups of container of a given length along the direction from the remaining groups and to form a layer of groups of containers.

An example of end station is shown, for example, in U.S. Pat. No. 7,896,151.

The unit of that known end station substantially comprises: a distribution belt which receives a plurality of containers in abutting relationship with each other; a conveyor belt for forming a plurality of batches separated by a gap from the containers conveyed by distribution belt; and a forming belt for forming the row or the layer of the previously formed batches.

Furthermore, the unit comprises: a first motor for driving the distribution belt; a second motor for driving the conveyor belt; and a third motor for driving the forming belt.

In detail the first motor and the second motor drive the distribution belt and the conveyor belt respectively at different speeds in order to allow the separation of the batches onto the conveyor belt from the groups still travelling on the distribution belt.

Still more precisely, the first motor intermittently accelerates the first conveyor, moves it at a constant speed and decelerates the first conveyor until the latter stops.

The second motor drives the conveyor belt at a constant speed.

A need is felt within the industry to simplify the construction of the above unit.

Furthermore, a need is felt within the industry to avoid the inevitable errors in the positioning of the batches upstream of the conveyor belt penalizes the correct separation of the batches form the remaining groups.

Finally, a need is felt within the industry to avoid that the precision in the gap between the batches is penalized by the fact that the first conveyor is intermittently accelerated and decelerated.

SUMMARY OF THE INVENTION

It is an object of the present invention to provide a unit for forming a group of articles, which meets at least one of the above requirements.

The aforementioned object is achieved by the present invention as it relates to a unit for forming a layer of batches of groups of articles.

Furthermore, the present invention relates to a method for forming a layer of batches of groups of articles.

The present invention also relates to a method for forming a batch of groups of articles.

Finally, the present invention relates to a method for forming a batch of groups of articles.

BRIEF DESCRIPTION OF THE DRAWINGS

One preferred embodiment is hereinafter disclosed for a better understanding of the present invention, by way of non-limitative example and with reference to the accompanying drawings, in which:

FIGS. 1 and 2 schematically show a top view and a lateral view of a unit for forming a group in accordance with the present invention;

DETAILED DESCRIPTION OF THE INVENTION

Figure 3:
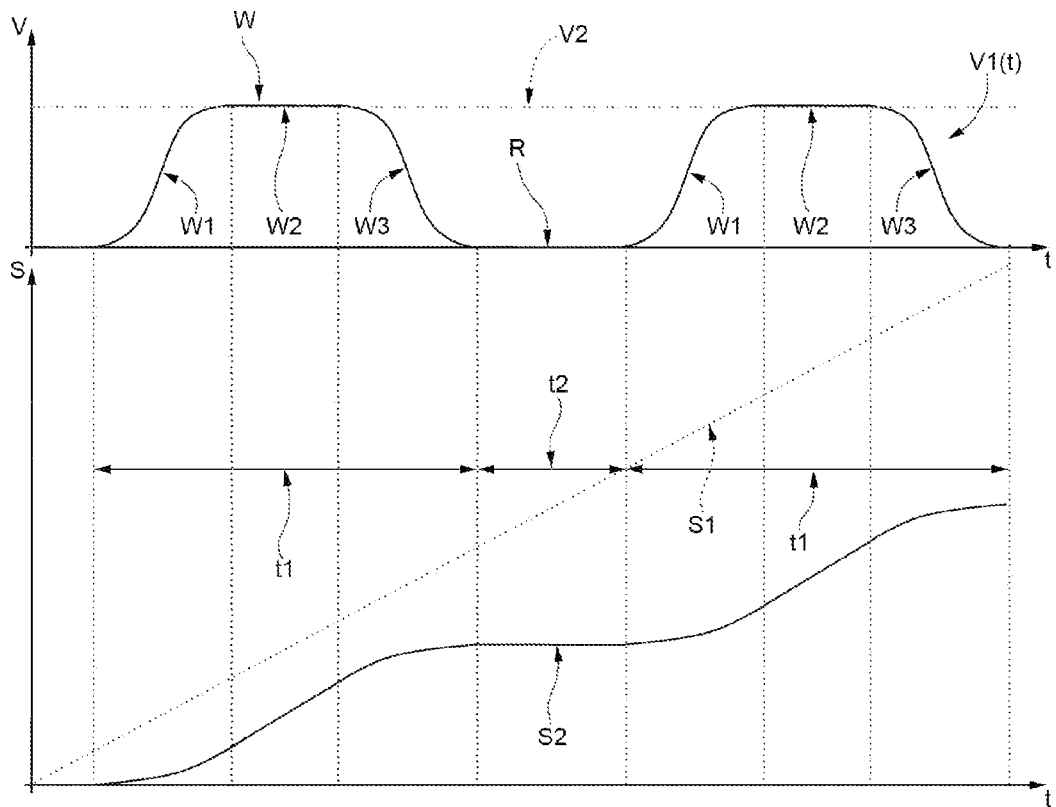
FIG. 3 shows the speed and displacement profiles versus time of a first and a second conveyor of the unit of FIGS. 1 and 2.

With reference to FIGS. 1 to 5, numeral 1 indicates a unit for forming batches 2 of groups 3 of articles, in particular containers filled with pourable products.

In detail, unit 1 is fed with groups 3 of packaged articles, forms batches 2 having each a length L and separated by a gap D, measured along a direction X.

Furthermore, unit 1 creates a layer 40 (only schematically shown in FIG. 1) of batches 2 which will be eventually palletized into a not-shown pallet.

Unit 1 substantially comprises, proceeding according to an advancing direction of groups 3 along direction X; a conveyor 5 which is fed with groups 3 from a machine arranged upstream of conveyor 5 and conveys groups 3 in abutting relationship with each other; and a conveyor 6 which separates, one after the other, each batch 2 from the remaining groups 3 for gap D.

In the embodiment shown, conveyor 5 is fed with a single row of groups 3 from the upstream machine.

Furthermore, conveyors 5,6 are belt conveyor.

Unit 1 also comprises: a motor 7 for driving conveyor 5; and a motor 8 for driving conveyor 6.

In the embodiment shown, motors 7, 8 are brushless motors.

Advantageously, unit 1 comprises manipulating means 9 for manipulating separated batches 2 onto an area 4 of conveyor 6, so as to form layer 40.

Manipulating means 9 are movable along direction X, and along directions Y, Z orthogonal to each other and to direction X and may rotate about direction Z.

More precisely, direction Y is horizontal and direction Z is vertical, in the embodiment shown.

Gap D depends on the layer to be formed by manipulating means 9 and, in particular, on the time required by manipulating means 9 for forming the layer.

Conveyor 5 comprises, in turn, proceeding according to the advancing direction of groups 3 along direction X: a section 11; and a section 12.

In the embodiment shown, section 11 is made by a material having a first friction coefficient and section 12 is made by a material having a second friction coefficient.

The first friction coefficient is greater than the second friction coefficient.

Conveyor 6 is made by a material having a third friction coefficient which is substantially similar to the second friction coefficient.

In this way, the thrust of groups 3 in loading onto section 11 is contrasted by the friction of material of section 11.

Furthermore, due to the fact that the second and the third material have similar friction coefficient, the risk that groups 3 slide during the movement between section 12 and conveyor 6 is reduced.

Unit 1 comprises (FIG. 1): sensing means 15 arranged on conveyor 5 for sensing the passage of groups 3 on that conveyor 5; and sensing means 16 arranged on conveyor 6 for sensing the presence of groups 3 on that conveyor 6.

Sensing means 15 are preferably arranged close to an end 17 of conveyor 5 adjacent to conveyor 6.

Sensing means 15 are adapted to sense the accumulation of a given number of groups 3 onto conveyor 5.

Sensing means 16 are preferably arranged close to an end 18 of conveyor 5 adjacent to conveyor 5.

Sensing means 16 are arranged at a distance F from end 18 measured along direction X (FIG. 2).

Sensing means 15 comprise, in the embodiment shown, a first photocell formed by a receiver and an emitter aligned along direction Y orthogonal to direction X.

In a completely analogous manner, sensing means 16 comprise, in the embodiment shown, a second photocell formed by a receiver and an emitter aligned along a direction Y orthogonal to direction X.

Unit 1 also comprises a control unit 20 (FIG. 2) for controlling motor 7 and, therefore, for generating a speed profile V1 of conveyor 5.

Motor 8 is driven at a constant speed V2, which may be adjusted in dependence of the number of groups 3 fed to section 11 and of the number of groups 3 loaded on conveyor 5.

In the embodiment shown, motor 7 and 8 are functionally connected to each other.

In greater detail, control unit 20 comprises an electronic cam which controls speed profile V1 in dependency of speed of motor 8.

In other words, motor 8 is the master element of the electronic cam and motor 7 is the slave element of the above electronic cam.

In this way, the speed profile V1 of conveyor 5 varies with the variation of speed V2 of conveyor 6.

In the embodiment shown, control unit 20 is configured for controlling motor 8 in such a way that conveyor 6 moves at constant speed V2.

Control unit 20 is configured for controlling motor 7 in such a way that conveyor 5 cyclically moves for a time interval t1 and stops for a time interval t2.

As a result, speed profile V1 comprises a work portion W and a rest portion R.

In detail, work portion W comprises (FIGS. 3 to 5): an accelerating section W1 along which conveyor 5 moves for a length A1 along direction X; a constant speed section W2 along which conveyor 5 moves for a length A2 along direction X; and a decelerating section W3 along which conveyor 5 moves for a length A3 along direction X.

Conveyor 5 moves along section W1, W2, W3 for respective time-intervals t3, t4, t5.

It goes without saying that t1=t3+t4+t5.

In the embodiment shown, control unit 20 controls motor 7 in such a way that conveyor 5; accelerates from a null speed to speed V2 along section W1; decelerates from speed V2 to a null speed along section W3.

Preferably, the speed of conveyor 5 varies with respect to time like a polynomial along sections W1 and/or W3.

Preferably, the speed of conveyor 5 along section W2 equals speed V2 of conveyor 6.

In particular, the electronic cam ensures that when, speed V2 changes, conveyor 5 accelerates up to speed V2 along section W1, travels at speed V2 along section W2 and decelerates from speed V2 along section W3.

Conveyor 6 moves for lengths A2, A4, A6 during time intervals t3, t4, t5 respectively.

Furthermore, conveyor 6 moves for a length A7 during time interval t2.

With reference to FIG. 3, S1 and S2 indicates the displacement of conveyor 5 and 6 respectively versus time.

Control unit 20 is configured for: receiving the signal generated by sensing means 16 and associated to the passage of batch 2 at a given position on conveyor 6; and updating speed profile V1 of conveyor 5 along section W, on the basis of the signal generated by sensing means 16.

Figure 4:
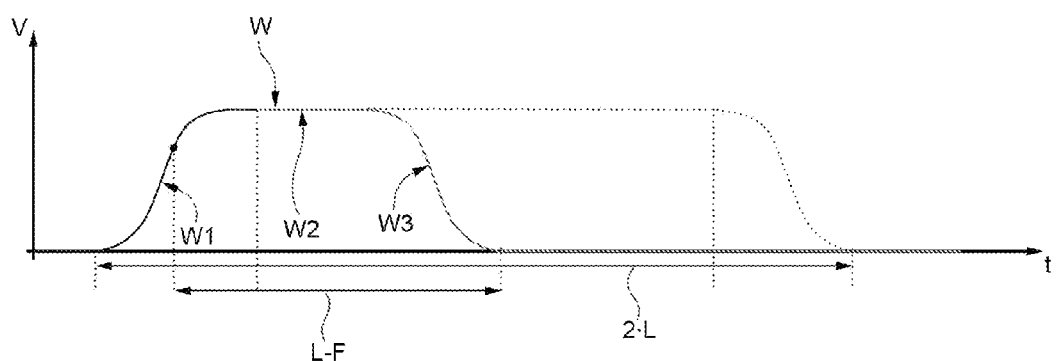
FIG. 4 shows the updating of the speed profile of the second conveyor of FIG. 3.

In greater detail control unit 20 is configured for updating the speed profile of conveyor 6, from a nominal configuration, to an updated configuration, every time a new batch 2 is separated by conveyor 6, as shown in FIG. 4.

In the nominal configuration, control unit 20 is configured for generating a speed profile V1 of conveyor 5 such that conveyor 5 travels for a length 2*L during time interval t1. In the updated configuration, speed profile V1 of conveyor 5 is such that group 3 travels for a length L-F, after sensing means 16 sense the presence of batch 2 on conveyor 6.

In this way, conveyor 5 stops exactly when batch 2 of length L has been loaded on conveyor 6, irrespective of the initial position of groups 3 forming batch 2.

Figure 5:
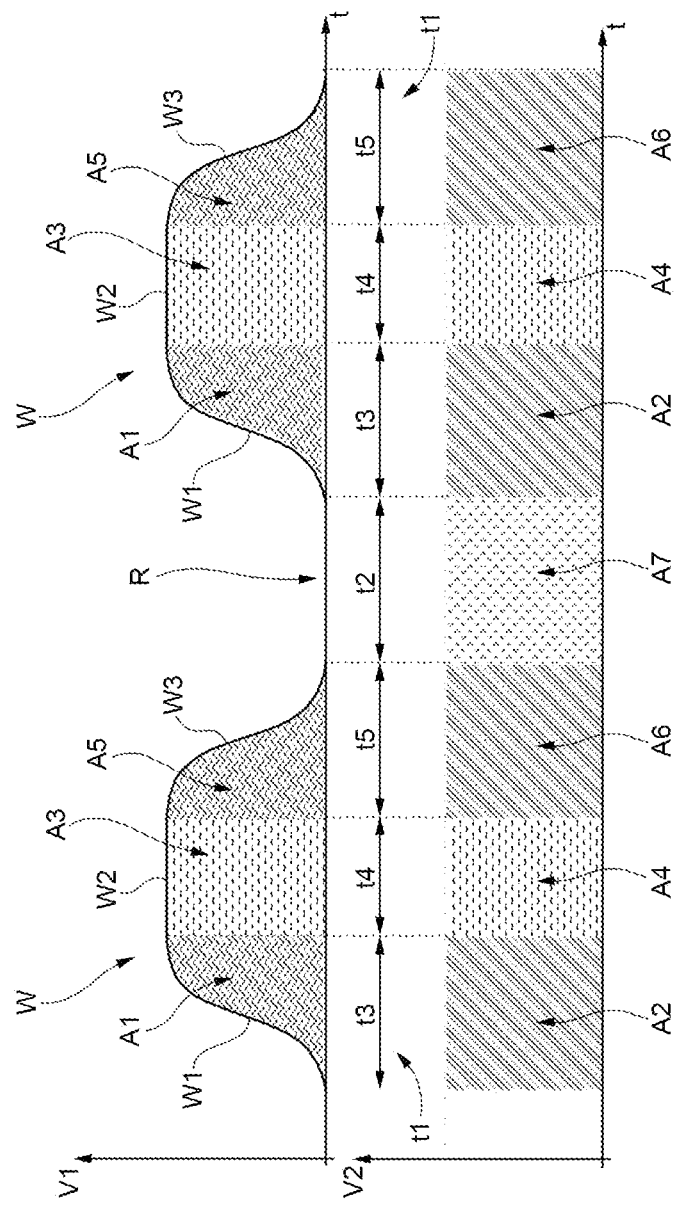
FIG. 5 shows the speed profiles of the first and second conveyor of FIGS. 3 and 4 during an operation step in which a gap between the batches is formed.

Furthermore, with reference to FIG. 5, control unit 20 is configured to calculate length A7 as:

$$A7 = D - (A2 - A1) - (A6 - A5).$$

In this way, the length lost by conveyor 5 relative to conveyor 6 along section W1 —which equals to A2−A1—is recovered as well as the length lost by conveyor 5 relative to conveyor 6 along section W3—which equals A6−A5.

A software is loaded onto control unit 20 which, when executed, implements the above operations.

In use, conveyor 5 receives groups 3 of packaged containers from the upstream machine and feeds group 3 along direction X to conveyor 6.

In greater detail, conveyor 5 cyclically advances for a time interval t1 and rests for a time interval t2, following the speed profile V1 (FIG. 5).

More precisely, conveyor 5 moves for lengths A1, A2, A3 for respective time intervals t3, t4, t5.

At the same time, conveyor 6 moves at speed V2.

Accordingly, when conveyor 5 stops, conveyor 6 continues to move at speed V2.

In this way, conveyor 6 separates, one after the other, batches 2 from the remaining groups 3.

More precisely, each batch 2 is distanced from the remaining groups 3 still travelling onto conveyor 5 for gap D.

The passage of groups 3 of each batch 2 on conveyor 6 is sensed by sensing means 16 which generate a corresponding signal.

Control unit 20 receives the signal generated by sensing means 16 and updates the speed profile of conveyor 5.

In detail control unit 20 controls motor 7 in such a way that conveyor 5 and, therefore, each batch 2, travels for a length L-F after sensing means 16 have detected the passage of the same batch 2 on conveyor 6.

In this way, it is ensured that the whole length L of each batch 2 is separated by conveyor 6 from the remaining groups 3 still travelling on conveyor 5.

In other words, conveyor 5 stops after the whole length L of each batch 2 has been separated by conveyor 6 from the remaining groups 3.

Furthermore, control unit 20 calculates length A7 as:

$$A7 = D - (A2 - A1) - (A6 - A5).$$

Batches 2 are manipulated onto conveyor 6 by manipulating means 9, so as to form a layer of the pallet.

Speed V2 may be adjusted in dependence of the number of groups 3 fed to section 11 and of the number of groups 3 loaded on conveyor 5.

Due to the fact that motors 7, 8 are functionally connected by an electronic cam, speed profile V1 varies as a result of the variation of speed V2.

Gap D is set on the basis of the shape of layer 40 to be formed by manipulating means 9 and of the time required by manipulating means 9 to form the layer.

From an analysis of the features of unit 1 and of method for forming layer 40 made according to the present invention, the advantages it allows to obtain are apparent.

In particular, layer 40 is formed on the same conveyor 6 onto which batches 2 are separated.

Accordingly, unit 1 requires only two motors, namely motors 7 and 8, for creating layer 40.

As a result, unit 1 is cheaper, less bulky and easier to maintenance than the known unit disclosed in the introductory part of the present description.

Furthermore, sections 11,12 of conveyor 5 have different friction coefficients.

Accordingly, section 11 is capable of containing the thrust of groups 3 which are accumulating thereon, and section 12 avoids that groups 3 slide, during the movement between section 12 of conveyor 5 and conveyor 6.

Finally, control unit 20 updates speed profile of conveyor 5 every time batch 2 is separated from the remaining groups 3.

In this way, conveyor 6 separates a batch 2 of exact length L, irrespective of the initial positioning of batch 2 on conveyor 5.

As a result, the inevitable errors in the initial positioning of batch 2 and the movement of batch 2 relative to conveyor 5 do not affect the effectiveness of the separation action carried out by conveyor 6.

Control unit 20 also calculates length A7 on the basis of the required gap D and of the lengths A1, A2; A5, A6.

In this way, the differences in lengths A1, A2 and A5, A6, which are due to the fact that the acceleration/deceleration of conveyor 5 at speed V2 is not immediate, do not affect the precision in the formation of gap D between batches 2

Finally, it is apparent that, modifications and variants not departing from the scope of protection of the claims may be made to unit I and method for forming layer 40 of batches 2 of groups 3.

What is claimed is:

1. A unit for forming a layer batches of groups of articles, comprising:
    a first conveyor comprised of a driven first belt and adapted to convey a plurality of said groups in an abutting relationship in a first advancing direction, the first conveyor being a stop-and-go conveyor that cyclically stops and moves the first belt;
    a second conveyor comprised of a driven second belt, and adapted to separate a first batch of groups of articles at a first location on said second belt from remaining groups of articles located at other locations on said second belt and form a gap between said separated first batch and the remaining groups on the second belt; and
    manipulating means adapted to manipulate said separated first batch on the second belt to arrive next to another batch on the second belt to thereby form the layer of the batches of groups of articles on the second belt, wherein the manipulating means moves said separated first batch on the second belt, in at least a second traverse direction to the first advancing direction, to arrive next to said other batch and into said layer located at an area of the second belt defined by said second conveyor, said layer comprised of at least said separated first batch and said other batch being arranged for palletization, said manipulating means movable along the second belt in the first advancing direction (X), the second traverse direction (Y), and rotatable in a third direction (Z) vertical to the first advancing direction (X) and the second traverse direction (Y).

2. The unit of claim 1 further comprising:
    a first motor for advancing said first belt of said first conveyor according to a speed profile;
    g means for generating a signal associated to the position of said first batch on said second conveyor; and
    a control unit for controlling said first motor, on the basis of said signal.

3. The unit of claim 2 further comprising a second motor for advancing said second belt of said second conveyor; said control unit being configured for controlling said first motor on the basis of the operation of said second motor.

4. The unit of claim 1 wherein said first conveyor comprises:
    a first section having a first friction coefficient; and
    a second section having a second friction coefficient and which interacts, in use, with said groups downstream of said first section, proceeding according to an advancing direction of said groups on said first conveyor.

5. The unit of claim 2 wherein said control unit is configured for updating said speed profile of said first motor on the basis of said signal.

6. The unit of claim 5 wherein said updated speed profile is configured in such a way that said first conveyor advances for a first distance after said sensing means have detected, in use, the presence of said first batch.

7. The unit of claim 6 wherein said first distance equals the difference between a length of said first batch to be separated and the distance of said sensing means from a given fixed point associate to said second conveyor.

8. The unit of claim 2 wherein said control unit is configured for intermittently moving said first conveyor for a second distance and a for a first time interval; moving said second conveyor for a third distance and for said first time interval;

moving said second conveyor relative to said first conveyor for a fourth distance and for a second time subsequent to said first time interval, in order to create said gap; and updating said fourth distance on the basis of said gap and on the basis of said difference between said third distance and said second distance.

9. The unit of claim 1 further comprising:
a first motor for advancing said first belt of said first conveyor according to a speed profile;
sensing means for generating a signal associated to the position of said first batch on said second conveyor; and
a control unit for controlling said first motor, on the basis of said signal, the control unit controlling the first conveyor to stop the first belt upon said first batch moving from the first conveyor onto the second conveyor, while the second conveyor continues to move at a constant speed.

10. A unit for forming a layer of at least one batch of groups of articles, comprising:
a first conveyor adapted to convey a plurality of said groups in an abutting relationship;
a second conveyor adapted to separate said batch from said remaining groups for a gap;
manipulating means adapted to manipulate said separated batch onto an area defined by said second conveyor;
a first motor for advancing said first conveyor according to a speed profile;
sensing means for generating a signal associated to the position of said batch on said second conveyor;
a control unit for controlling said first motor, on the basis of said signal;
a second motor for advancing said second conveyor, said control unit being configured for controlling said first motor on the basis of the operation of said second motor,
wherein said first conveyor comprises:
a first section having a first friction coefficient; and
a second section having a second friction coefficient and which interacts, in use, with said groups downstream of said first section, proceeding according to an advancing direction of said groups on said first conveyor.

11. A method for forming a layer of batches of groups of articles, comprising the steps of:
i) advancing, in a first direction, a plurality of groups in abutting relationship on a first belt of a first conveyor which moves along a speed profile;
ii) separating, on a second belt of a second conveyor, a first batch from a plurality of remaining groups for a gap between said separated first batch and the remaining groups on the second belt; and
iii) manipulating said separated first batch on the second belt by moving said separated first batch on the second belt, in at least a second traverse direction to the first advancing direction, to arrive next to another batch on the second belt so as to form said layer onto an area defined on the second belt of said second conveyor, said layer comprised of at least said separated first batch and said other batch being arranged for palletization.

12. The method of claim 11 further comprising the steps of:
iv) generating a signal associated to the position of said first batch on said second belt of said second conveyor; and
v) updating said speed profile of said first conveyor on the basis of said signal.

13. The method of claim 12 wherein step v) further comprises advancing said first conveyor for a first distance after said step iv).

14. The method of claim 11 further comprising the steps of:
vi) intermittently moving said first conveyor for a second distance and a for a first time interval;
vii) moving said second conveyor for a third distance and for said first time interval;
viii) moving said second conveyor relative to said, first conveyor for a fourth distance and for a second time interval subsequent to said first time interval, in order to create said gap; and
ix) updating said fourth distance on the basis of said gap and on the basis of said difference between said third distance and said second distance.

15. The method of claim 11, comprising the further steps of:
iv) generating a signal associated to the presence of said first batch on said second conveyor, by using sensing means; and
v) updating said speed profile on the basis of said signal.

16. The method of claim 11, comprising the further steps of:
iv) intermittently moving said first conveyor for a first distance and a for a first time interval;
v) moving said second conveyor for a second distance and for said first time interval;
vi) moving said second conveyor relative to said first conveyor for a third distance and for a second time interval subsequent to said first time interval, in order to create said gap; and
vii) updating said third distance on the basis of said gap and on the basis of said difference between said second distance and said first distance.

17. The method of claim 16, further comprising the step vii) of stopping said first conveyor for said second time interval.

* * * * *